United States Patent
Yajima et al.

[11] Patent Number: 6,044,664
[45] Date of Patent: Apr. 4, 2000

[54] SYNTHETIC SILICA GLASS MANUFACTURING APPARATUS

[75] Inventors: Shouji Yajima; Norihisa Yamaguchi; Kazuhiro Nakagawa, all of Sagamihara; Hiroki Jinbo, Yokohama, all of Japan

[73] Assignee: Nikon Corporation, Tokyo, Japan

[21] Appl. No.: 09/161,490

[22] Filed: Sep. 28, 1998

[30] Foreign Application Priority Data

Sep. 29, 1997 [JP] Japan ..................................... 9-263955
Sep. 29, 1997 [JP] Japan ..................................... 9-263956

[51] Int. Cl.[7] ........................... C03B 37/018; F16M 11/24
[52] U.S. Cl. ................................ 65/414; 65/17.4; 65/421; 248/676; 248/677; 248/163.1; 248/176.2; 248/188.2; 248/188.3; 264/81; 414/609; 414/617
[58] Field of Search ........................... 65/17.4, 414, 421; 248/163.1, 176.2, 177.1, 188.2, 188.3, 188.8, 188.9, 676, 677; 264/81; 414/609, 617

[56] References Cited

U.S. PATENT DOCUMENTS

| | | | |
|---|---|---|---|
| 1,753,722 | 4/1930 | Schaum | 248/188.8 |
| 3,620,702 | 11/1971 | DeKalb et al. | 65/17.4 |
| 4,048,776 | 9/1977 | Sato | 52/297 |
| 4,414,012 | 11/1983 | Suto et al. | 65/17.4 |
| 4,419,118 | 12/1983 | Reiji et al. | 65/17.4 |
| 4,432,781 | 2/1984 | Okamoto et al. | 65/17.4 |
| 4,500,642 | 2/1985 | Reiji et al. | 501/54 |
| 5,437,236 | 8/1995 | Zeiner | 108/147 |
| 5,698,484 | 12/1997 | Maxon | 501/54 |

*Primary Examiner*—Sean Vincent
*Attorney, Agent, or Firm*—Morgan, Lewis & Bockius LLP

[57] ABSTRACT

An apparatus is provided for synthesizing a silica glass ingot. The appartus includes a stage having a target plate thereover, the target plate being rotatable relative to the stage around a predetermined vertical axis, and a furnace for reacting material gas with combustion gas to synthesize the silica glass ingot on the target plate; the furnace having an opening at its bottom. The apparatus further includes an elevation system that moves the stage in a vertical direction parallel to the predetermined vertical axis so as to vertically move the target plate through the opening of the furnace, the elevation system supporting the stage from at least one side of the stage and lacking a structure directly below the stage that would substantially interfere with the vertical movement of the stage.

20 Claims, 9 Drawing Sheets

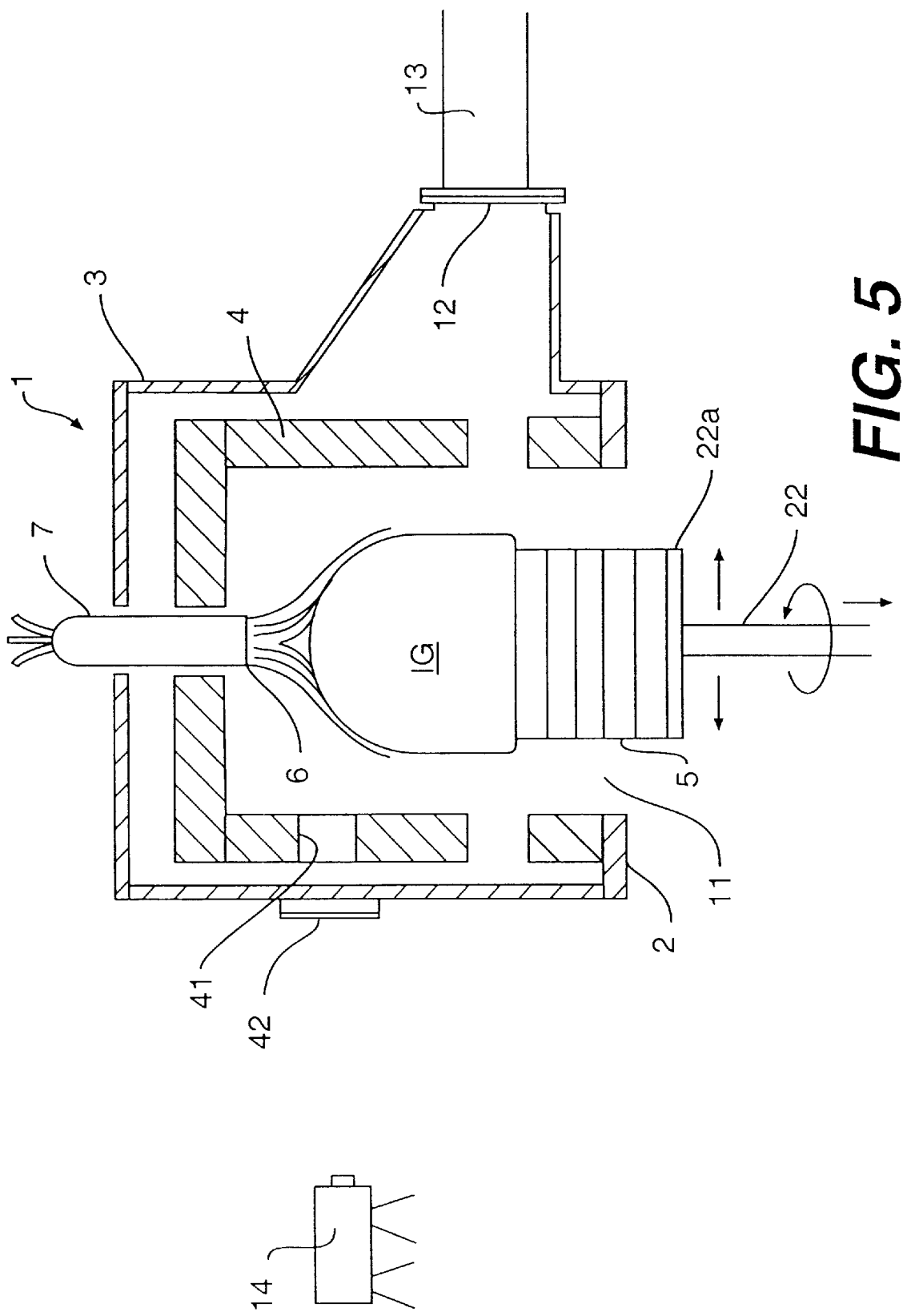

6,044,664

SYNTHETIC SILICA GLASS MANUFACTURING APPARATUS

This application claims the benefit of Japanese Applications No. 09-263955 and No. 09-263956, both filed in Japan on Sep. 29, 1997, which are hereby incorporated by reference.

BACKGROUND OF THE INVENTION

1. Field of the Invention

The present invention relates to a synthetic silica glass manufacturing apparatus for manufacturing silica glass, and more particularly, to a synthetic silica glass manufacturing apparatus for manufacturing silica glass optical members, such as lenses and mirrors, for use in the wavelength range of 400 nm or less or in the range of 300 nm or less in photolithography technology.

2. Discussion of the Related Art

Currently, an exposure apparatus, called a stepper, has been used for photolithography technology to expose and transcribe very fine patterns of integrated circuits onto a wafer made of silicon. Due to recent trends towards greater integration of LSI, shorter wavelengths, from the g-line (436 nm) and the i-line (365 nm) to excimer lasers, such as KrF (248 nm) and ArF (193 nm), have increasingly being used as a light source for the stepper.

LSI has developed into VLSI (Very Large Scale Integration), which is a subset of LSI. For example, in the case of DRAM as an example of VLSI, the capacity has been increased as 1K→256K→1M→4M→16M→64M→256M→1G. Due to this increase in capacity, the desired resolution of the steppers in exposing fine lines has been significantly increased as 10 $\mu$m →2 $\mu$m→1 $\mu$m→0.8 $\mu$m→0.5 $\mu$m→0.35 $\mu$m→0.25 $\mu$m→0.18 $\mu$m.

Accordingly, high resolution and deep focal depth are required for the projection lenses for steppers. In general, for the illumination optical system and the projection optical system of steppers, multi-element optical glass having a high transmittance is used as the lens material for the i-line. In the case of excimer lasers, such as KrF and ArF lasers, synthetic silica glass and single crystal fluoride, such as $CaF_2$ (fluorite), are used instead of conventional optical glass.

In particular, in mass-production lines for microprocessors which are used as a VRAM having a high capacity of 16M or more, steppers using an excimer laser that is capable of exposing a line width of 0.25 $\mu$m have been introduced. For the optical devices of such ultraviolet light lithography (lens materials used in illumination or projection optical systems), a high purity synthetic silica glass is used in order to achieve a high transmittance within the ultraviolet light range.

One of the known effective manufacturing methods of this synthetic silica glass is a flame hydrolysis method. In the flame hydrolysis method, a silicon compound (the material of synthetic silica glass) is supplied to an oxy-hydrogen flame formed by a combustion burner, and hydrolyzed to produce minute silica particles. The minute silica particles are then deposited, fused, and are vitrified.

A synthetic silica glass manufacturing apparatus that performs this synthesis method has a structure similar to that of so-called "Bernoulli furnace." The apparatus has an outer wall having a double-wall structure to efficiently store heat and has an exhaust. The synthesis is conducted by maintaining a high temperature of 1000° C. or more inside the furnace. This manufacturing apparatus is structured by assembling fireproof members (fireproof parts) inside the furnace (furnace frame) and has a target located for forming an ingot thereon and a burner pointing towards the target for synthesizing silica glass.

The target is arranged on a stage in such a way as to be vertically movable. By lowering the stage at the same speed as the growing speed of the silica glass, an appropriate distance between the burner and the synthesis surface of the silica glass can be maintained. In addition, in order to supply a flame temperature (supplied thermal energy) from the burner uniformly to the synthesis surface of the silica glass during the silica glass synthesis, the target is rotated and swayed at the same time.

However, the silica glass synthesized using the synthetic silica glass manufacturing apparatus described above often has a non-uniform refractive index profile for various reasons. One of the causes of the irregularity is the fluctuation of various conditions (changes in synthesis conditions) during the synthesis of the silica glass. Among others, a positional deviation of the target relative to the furnace and mismatch of the growth speed of the silica glass with the lowering speed of the stage are significant factors.

In general, a synthetic silica glass manufacturing apparatus is constructed of a furnace and an elevation system. The furnace and the elevation system are structured such that they can be separated and placed on the floor separately. The elevation system supports the stage such that the stage is vertically movable, and the target is rotatably mounted on the stage of the elevation system. Therefore, in order to avoid inducing the above-mentioned causes, the elevation system is aligned at the beginning of the synthesis so that each condition of synthesis is fixed to a predetermined state.

There are cases where the elevation system needs to be moved away from the furnace; for example, when the apparatus undergoes maintenance. Therefore, a plurality of saucers is provided for supporting the legs of the elevation system on a floor below the synthetic silica glass manufacturing apparatus. The number of the saucers corresponds to the number of legs. After the maintenance, the position of the elevation system relative to the furnace is aligned by placing the legs of the elevation system on the saucers.

However, the saucers are formed as a disk shape with a planar surface in the conventional art, and therefore, by merely placing the legs on the saucers, it is difficult to reproduce the aligned condition which is previously set at the beginning of prior synthesis (alignment at the beginning of the synthesis). This necessitates additional time for re-aligning when synthesis is re-started.

For the elevation system, considering the load of the ingot after the synthesis is finished, it is desirable to arrange the center of the stage to correspond to the rotating axis of the target. Here, a system like a jack may be applicable to the elevation device. However, the alignment precision of such a system is low and it requires a large space around the lower portion of the stage. Therefore, such a system can neither be arranged directly below the stage, nor can it have a long stroke. Accordingly, such a system cannot be effectively used for the synthetic silica glass manufacturing apparatus.

In addition, in order to vertically move the target (stage) with high precision, a highly precise actuator is necessary. However, the ingot of the synthetic silica glass exceeds as much as 200 kg at the end of the synthesis. Also, the target for supporting the ingot and the rotation and translation system unit weigh approximately 200 kg. Therefore, a suitable elevation system requires a load resistance of 400 kg or more as well as very little tolerable positional deviation during its elevation motion.

SUMMARY OF THE INVENTION

Accordingly, the present invention is directed to a synthetic silica glass manufacturing apparatus that substantially obviates the problems due to limitations and disadvantages of the related art.

An object of the present invention is to provide a synthetic silica glass manufacturing apparatus which is capable of manufacturing an ingot of synthetic silica glass having a superior quality.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the synthetic silica glass manufacturing apparatus of the present invention includes a furnace, a target for synthetic silica glass manufacturing, a rotating shaft that supports this target so that the target rotates in a horizontal plane, a burner for synthesizing silica glass, and an elevation device. The target is located in the inside of the furnace and is supported by the elevation stage. The rotation shaft extends in the vertical direction and is rotatably supported by the elevation stage. The burner for synthesizing silica glass has a nozzle pointing towards the target. The elevation device raises and lowers the target relative to the burner by raising and lowering the elevation stage.

During the synthesis, the elevation stage is lowered at the same speed as the growth speed to maintain a predetermined distance between the burner and the synthesis surface, and the target is at the same time rotated by rotating and swaying the rotation shaft. With the synthetic silica glass manufacturing apparatus having the above-described structure, it is possible to deposit synthetic silica glass on the target while supplying thermal energy from the burner uniformly over a wide range of the synthesis surface.

Here, the elevation device includes an elevation post that extends vertically (parallel to the rotation shaft), a elevation member vertically movable along the elevation post, and a drive system. The elevation stage is supported by the elevation member which are raised and lowered by the drive system.

With this construction, when the elevation stage is lowered while the synthetic silica glass is deposited, the elevation system supporting the elevation stage is not located directly below the elevation stage but is remote from the rotation shaft and located in parallel with the rotation shaft. Thus, the elevation system and the rotation shaft do not interfere with each other.

Here, it is preferable that a rail-shaped upright sliding unit is used as the elevation post and that the drive system includes a precision ball screw engaged with the elevation member, a motor with a brake for rotating the precision ball screw, and a reduction gear capable of transforming the rotation of the motor to the precision ball screw with various reduction ratios.

With this structure, it is possible to control the horizontal position of the synthesis surface relative to the burner with error within about 0.01 mm in the XY plane during the vertical movement of the elevation stage. The position in the vertical direction can be controlled by changing the reduction ratio of the reduction gear and/or by directly changing the rotational speed of the motor.

Also, it is preferable that the elevation system is mounted on a base and that at least three supporting legs projecting downward from the base are provided for supporting the base on a floor. The saucers allowing these supporting legs to be placed thereon are fixed on the mounting surface (floor) of the base, and by placing the supporting legs on these saucers, the mounting position of the synthetic silica glass manufacturing apparatus can be aligned.

Here, among the at least three types of saucer, the first saucer has an inverse cone-shaped slot that allows one of the supporting legs to be placed thereon, the second saucer has a V-shaped gutter that allows another one of the supporting legs to be placed thereon, and the third saucer has a plane-shaped upper surface for mounting the remaining one of the supporting legs.

With this structure, when the base is mounted on the saucers by placing one of the supporting legs onto the inverse cone-shaped slot of the first saucer, the supporting leg on the first saucer does not shift. Therefore, it is possible to roughly adjust the elevation device. Also, even if there are changes in the pitches between the supporting legs due to increase in temperature during the synthesis, the supporting leg in the second saucer can move along the V-shaped gutter. Accordingly, it is possible to support the base without generating undesirable stress.

It is preferable for the supporting legs to be screwed into the base so that the supporting legs can be raised or lowered relative to the base by rotating the supporting legs. With this structure, it is possible to adjust the inclination angle of the base by lowering and raising the supporting legs. Accordingly, it is possible to conduct precise adjustment of the inclination angle of the elevation system.

In addition, it is preferable for each of the supporting legs to have a hemispherical shape on its tip at which contact is made with the saucers. With this structure, positional shifts that may occur during the installation can be avoided owing to the small contact area with the saucer.

In another aspect, the synthetic silica glass manufacturing apparatus according to the present invention includes a furnace, a target for forming synthetic silica glass, a burner for synthesizing silica glass, and an elevation device. The target is located in the interior of the furnace and is supported by the elevation stage. The burner for synthesizing the silica glass is arranged with its nozzle pointing toward the target. The elevation device raises and lowers the target in the vertical direction relative to the burner by raising and lowering the elevation stage.

In this respect of the present invention, the elevation device includes a plurality of elevation posts and a plurality of elevation members adapted to be vertically movable along the respective elevation posts. The plurality of elevation posts is arranged at approximately symmetrical positions in the horizontal plane relative to the center of load which is to be applied in the vertical direction to the elevation stage supported by the elevation members. For example, in the case of having two elevation posts, a preferable structure is such that the center of the target, which corresponds to the center of the load of the elevation stage, is positioned approximately at the center position between the two elevation posts.

Therefore, even when the weight of the ingot increases as the deposition of silica glass progresses, and as a result, the elevation stage supporting the target is bent, because the center of the target, which corresponds to the center of the load applied to the elevation stage, is located approximately at the middle of the multiple elevation posts supporting the elevation stage, the target moves only in the vertical downward direction and almost no inclination occurs in the stage. Therefore, the synthesis conditions do not significantly change from the beginning of the synthesis to the end of the synthesis.

With such a structure of the synthetic silica glass manufacturing apparatus, by rotating and swaying the target while lowering the elevation stage at the same speed as the growth speed in order to maintain a predetermined distance between the burner and the synthesis surface, the thermal energy from the burner can be supplied uniformly over a wide rage of area including the entire synthesis surface while depositing synthetic silica glass on the target.

In such a synthetic silica glass manufacturing apparatus, it is preferable that the elevation stage is fastened only to one of the multiple elevation members, and the other elevation member(s) merely supports the elevation stage by placing the stage thereon.

With this structure, even if the elevation stage expands due to the heat during the silica glass synthesis, such expansion can be absorbed between the elevation stage and the elevation member on which the elevation stage is merely supported. Therefore, even though there are multiple elevation posts, because there is no interference between the elevation posts due to the expansion of the elevation stage, raising and lowering of the elevation stage can be conducted with a smooth fashion.

In another aspect, the present invention provides a synthetic silica glass manufacturing apparatus, the apparatus including a furnace having an opening at its bottom; a target; a burner having a nozzle pointing towards the target for synthesizing silica glass on the target; an elevation stage; a vertically extending shaft fixed to the target and supported by the elevation stage to be rotationally and translationally movable relative to the elevation stage; and an elevation system that moves the elevation stage in the vertical direction so as to move the target through the opening of the furnace in the vertical direction relative to the burner, the elevation system including an elevation post extending in the vertical direction and disposed in parallel with the vertically extending shaft, an elevation member engaged with the elevation post to be movable in the vertical direction, the elevation member supporting the elevation stage, and a drive system that drives the elevation member in the vertical direction.

In another aspect, the present invention provides a synthetic silica glass manufacturing apparatus including a furnace having an opening at its bottom; a target; a burner having a nozzle pointing towards the target for synthesizing silica glass on the target; an elevation stage; a vertically extending shaft fixed to the target and supported by the elevation stage to be rotationally and translationally movable relative to the elevation stage; and an elevation system that moves the elevation stage in the vertical direction so as to move the target through the opening of the furnace in the vertical direction relative to the burner, the elevation system including a plurality of elevation posts arranged in a substantially symmetrical configuration in a horizontal plane with respect to the center of a load that is to be applied to the elevation stage in the vertical direction due to an increase in the weight of the silica glass on the target during the synthesis, and a plurality of elevation members each engaged with the respective one of the elevation posts, each of the elevation members being movable in the vertical direction and supporting the elevation stage.

In a further aspect, the present invention provides an apparatus for synthesizing a silica glass ingot, the appratus including a stage having a target plate thereover, the target plate being rotatable relative to the stage around a predetermined vertical axis; a furnace for reacting material gas with combustion gas to synthesize the silica glass ingot on the target plate; the furnace having an opening at its bottom; and an elevation system that moves the stage in a vertical direction parallel to the predetermined vertical axis so as to vertically move the target plate through the opening of the furnace, the elevation system supporting the stage from at least one side of the stage and lacking a structure directly below the stage that would substantially interfere with the vertical movement of the stage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 schematically shows a synthesis furnace of a synthetic silica glass manufacturing apparatus according to the present invention;

DETAILED DESCRIPTION OF THE PREFERRED EMBODIMENTS

Reference will now be made in detail to the preferred embodiments of the present invention, examples of which are illustrated in the accompanying drawings.

First Preferred Embodiment

Figure 1:
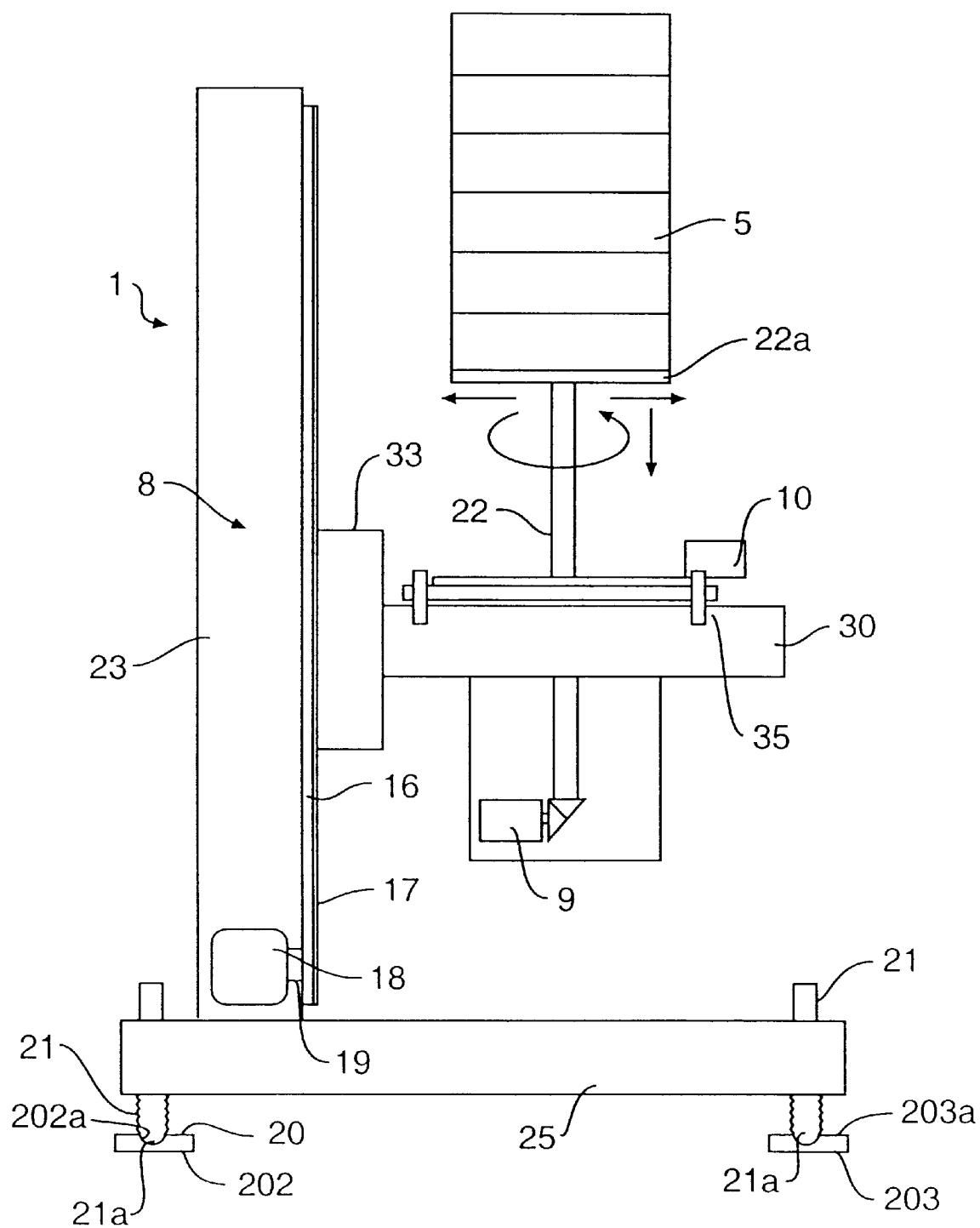
FIG. 1 schematically shows a preferred embodiment of an elevation system of a synthetic silica glass manufacturing apparatus according to the present invention.
Figure 2:
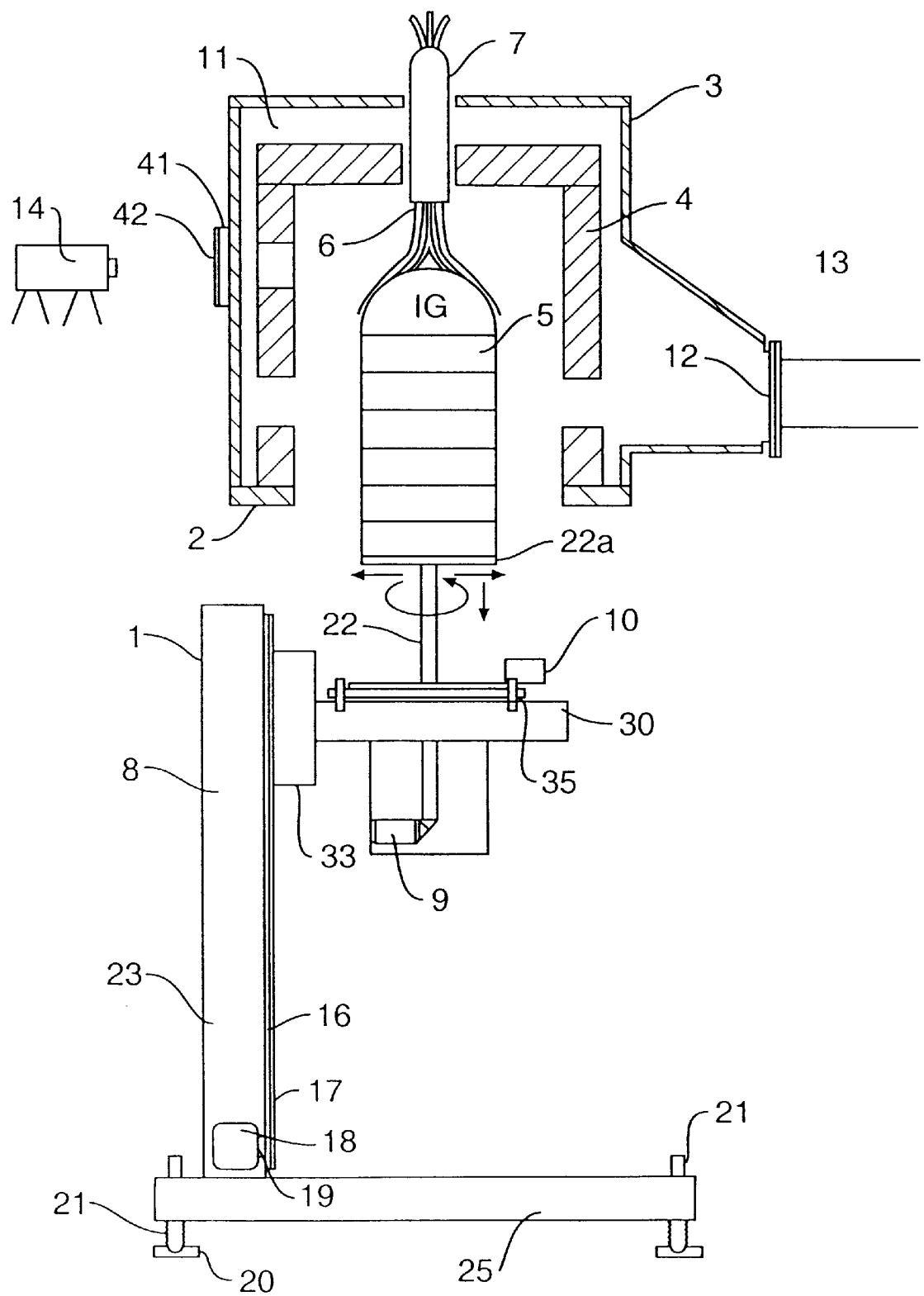
FIG. 2 schematically shows a preferred embodiment of a synthetic silica glass manufacturing apparatus including a synthesis furnace according to the present invention.

A first preferred embodiment of a synthetic silica glass manufacturing apparatus according to the present invention is described with reference to FIGS. 1–3. The synthetic silica glass manufacturing apparatus I includes a furnace frame 3, a fireproof member 4 provided in the interior of the furnace frame 3, and a furnace base plate 2 on which the furnace frame 3 and the fireproof member 4 are placed. A burner 7 having a nozzle 6 pointing toward a target 5 for silica glass synthesis is provided to synthesize and deposit silica glass on the target 5.

The furnace frame 3 has an exhaust opening 12 for discharging exhaust gas which is generated during the synthesis of the silica glass and an exhaust pipe 13 connected to the exhaust opening 12. In the exhaust pipe 13, a removal device, such as a scrubber, and an exhaust fan are provided to discharge the exhaust gas to the atmosphere (both are not shown in the figure).

In addition, a furnace monitoring window 41 is formed through the fireproof member 4 and through the furnace frame 3 to monitor the interior of the furnace from the outside. On the outside surface of the furnace monitor window 41, a heat-resistant glass 42 is installed with a gap to maintain the temperature inside the furnace. A furnace monitoring camera 14, such as a CCD camera, is provided to capture images of the interior 11, and especially to monitor the distance between the burner 7 and the synthesis surface of the synthetic silica glass.

The target 5 can be raised and lowered (only lowered during the synthesis) by an elevation system 8 (elevation device). The elevation system 8 is manufactured separately from the furnace and can be separated from the furnace when necessary. The elevation system 8 according to the present embodiment includes a support column 23 on a base 25, extending in the vertical direction, a set of rails 16 having two rail members disposed on the support column 23, and an elevation member 33 arranged to be movable along the rail 16 in the vertical direction.

The elevation member 33 is movable in the vertical direction through a precision ball screw 17 disposed at the center of the two rails 16 (between the two rail members). The precision ball screw 17 is driven by a elevation motor 18 which is installed on the support column 23. This elevation motor 18 includes a brake for supporting a stage 30 at the designated positions and a reduction gear 19.

The elevation system 8 is structured such that the inclination angle can be adjusted. This adjustment is made by adjusting the inclination angle of the base 25 by moving adjustment screws (supporting legs) 21 in the vertical direction. The adjustment screws 21 are structured so that they can be extended and retracted in the vertical direction relative to the base 25. The adjustment screws 21 have their bottom parts 21 a formed in a hemispherical shape, provided at the four locations: front, back, right, and left corners of the base 25, and are placed on the respective saucers 20.

Figure 3:
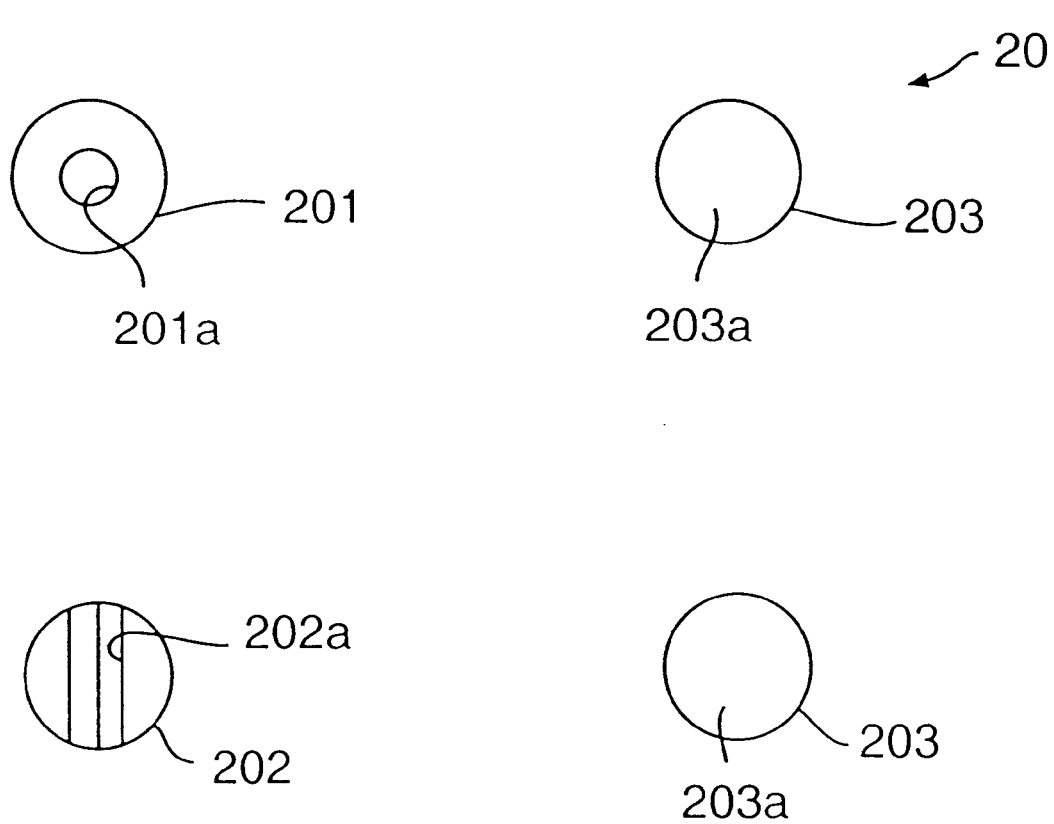
FIG. 3 is a top view of examples of the saucers for use in the synthetic silica glass manufacturing apparatus and their arrangement according to the present invention.
Figure 4:
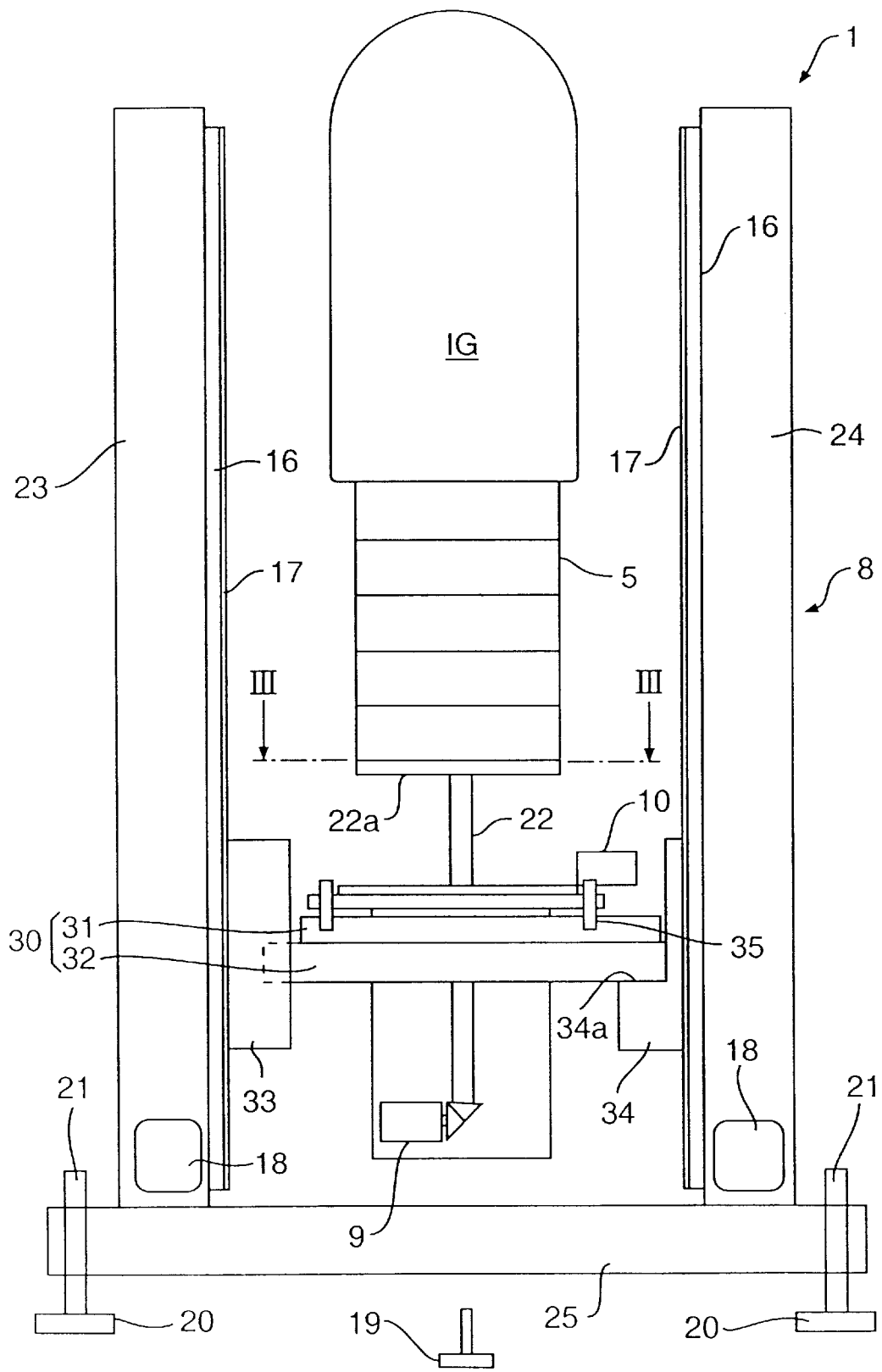
FIG. 4 schematically shows another preferred embodiment of an elevation system of a synthetic silica glass manufacturing apparatus according to the present invention.

As shown in FIG. 3, four saucers 20 are provided in accordance with the number of adjustment screws 21 and they are fixed to the floor (not shown) on which the synthetic silica glass manufacturing apparatus is to be mounted. Saucers 20 includes three kinds of saucers: a first saucer 201, a second saucer 202, and third saucers 203. Each of the saucers 201, 202 and 203 are disk shaped. On the upper surface of the first saucer 201, an inverse cone-shaped slot 201a is formed, and on the upper surface of the second saucer 202, a V-shaped gutter is formed. The upper surface 203a of each of the third saucers 203 is planar.

On the floor on which synthetic silica glass manufacturing apparatus 1 is mounted, the second saucer 202 is fixed such that the V-shaped gutter 202a extended towards the first saucer 201. On the other two areas, two third saucers 203 are fixed. Elevation system 8 is mounted on these saucers 20 thus constructed such that the bottom portions 21a of the adjustment screws are respectively engaged with the recessed portions 201a and 202a and the upper surface 203a of the two third saucers.

A stage (elevation stage) 30 is installed at the elevation members 33 of the elevation system 8. A rotation shaft 22 is installed on the stage 30 such that rotation, sway motion, and horizontal movement in the XY directions of the rotation shaft are possible. The rotation shaft is rotated by rotation motor 9, and is translationally moved by translation motor 10. The rotation shaft is supported by the rotation bearings at two or more points in the vertical direction, and it is rotated by controlling the rotation motor 9.

The stage 30 as structured above needs to move precisely in the vertical direction. Therefore, for elevation system 8, it is necessary to align the rotation shaft 22 and other parts with the precise vertical direction. The vertical alignment of the rotation shaft 22 and the other parts is performed by adjusting the inclination angle of rails 16. This can be done by raising or lowering adjustment screws 21 mounted on the saucers 20, thereby changing the inclination angle of the base 25.

The center position of rotation is aligned by moving rotation shaft 22 in the X-Y directions by using an adjustment screw 35 provided on the stage 30. In addition, the center pipe of burner 7, which is a pipe for expelling material, can similarly be aligned by moving adjustment screws or the like (not shown in the figures). As described above, by aligning each part, it is possible to lower the target 5 vertically with accuracy during formation of synthetic silica glass.

In the elevation system 8 as structured above, it is necessary to perform maintenance for the rails 16, precision ball screw 17, and motors 9, 10, and 18 after synthesis. In addition, maintenance is necessary in order to remove the minute silica particles attached to the fireproof member 4. During such maintenance, in order to avoid the attachment of minute silica particles onto the precision ball screw, etc., elevation system 8 needs to be separated from the furnace.

In order to separate the elevation system 8, as described above, adjustment screws 21 have to be displaced from the saucers 20. Therefore, at the beginning of the next synthesis, it is necessary to perform the alignment again.

After the maintenance is completed, drive system 8 is mounted on the saucers 20. First, the bottom portion 21a of the adjustment screw to be engaged with the first saucer 201 is placed in the inverse cone-shaped slot 201a, and the bottom portion 21a of the adjustment screw that corresponds to the second saucer 202 is placed in the V-shaped gutter 202a.

As described above, the bottom portion 21a of each adjustment screw has a hemispherical shape. Accordingly, the adjustment screws do not shift from the center of the cone-shaped slot 201a and V-shaped gutter 202a. Thus, even if the pitch between two or more of the adjustment screws 21 changes due to thermal expansion during the previous synthesis of the synthetic silica glass, the position of the first saucer 201 relative to the adjustment screw that is engaged with the first saucer 201 does not change.

In addition, even if the pitch between the adjustment screw 21 corresponding to the first saucer 201 and the adjustment screw 21 corresponding to the second saucer 202 is changed, because the adjustment screw 21 corresponding to the second saucer 202 can move along the V-shaped gutter 202a, the angle (rotational angle) of the elevation system 8 as viewed from above does not change.

By so maintaining the position of the saucers 20 and adjustment screws 21, it is possible to roughly resume the alignment that was achieved during the previous synthesis in the vertical direction, and further, fine adjustment is possible by raising and lowering the adjustment screws 21. Therefore, it is possible to reduce the alignment time. After the alignment, stage 30 is raised and lowered by rails 16, precision ball screw 17, elevation motor 18, and by reduction gear 19, thereby making it possible to conduct accurate positioning of the target 5.

Moreover, since rails 16 of the elevation system 8 and rotation shaft 22 are arranged remote from and in parallel with each other, extra space under the stage 30 is not required. Accordingly, it is possible to have an extra stroke for raising and lowering of the stage 30. Thus it is possible to create an even longer ingot.

In general, the growth rate of synthetic silica glass is a very slow: about 1.0 mm/h to about 4.0 mm/h. Therefore, a motor with high precision and controllability is required for driving the elevation in member 33. By providing the reduction gear 19 along with the elevation motor 18, it is possible to reduce rotation by the reduction ratio of the gear, increasing the precision and controllability.

In addition, the load limit of the elevation motor 18 increases by the reduction ratio of the reduction gear 19. Therefore, when the reduction gear 19 has a reduction ratio with a load limit such that even if the brake in the elevation motor 18 is released, stage 30 does not fall, the safety of the present apparatus I can be even further increased.

The present embodiment describes the case of the elevation system 8 in which the elevation post includes rails 16 which are rail-shaped upright sliding units, and precision ball screw 17, elevation motor 18 with a brake. Also, the reduction gear 19 are used in order to raise and lower the stage 30 which is engaged with the rails 16 through the elevation members 33. However, the present invention is not limited to this particular construction. For example, the elevation system is acceptable as long as the structure has one elevation post parallel to the rotation shaft 22, and a sliding rail may not be required. In addition, it is acceptable to structure the drive system for raising and lowering the stage 30 without using a precision ball screw but rather using a rack and a pinion gear. In addition, elevation motor 18 may not require a brake or reduction gear 19.

Also, the number of legs need not be four, and three legs or five or more legs are acceptable. Also, the saucers 20 may not be required to have the particular cone-shaped slot or V-shaped gutter, as described above. Moreover, even in the case that a cone-shaped slot or a V-shaped gutter are provided on the saucers 20, the supporting legs may not be required to have a screw system as described above. Other systems are acceptable as long as fine raising and lowering motion relative to the base 25 can be performed. Also, the shape of the bottom of the supporting legs may not be required to have a hemispherical shape.

First Working Example

A first working example is described with reference to FIGS. 1 and 2. In this example, $SiCl_4$ was used as the Si compound for the material, and $_2$ gas and $H_2$ gas were used for the carrier gas for carrying the Si compound. These gases were burned in the space surrounded by the fireproof member 4 formed of a material that is 99.9% or more of alumina, and synthetic silica glass was deposited on the target 5.

The bottom openings were provided in furnace frame 3 and fireproof member 4 for allowing vertical motion of the target 5 therethrough. The openings respectively have a circular shape. In addition, the target 5 was constructed by stacking multiple pieces of disk-shaped fireproof members each having a diameter of 250 mm and made of 99.9% alumina in order to avoid inclusion of impurities into the synthetic silica glass, as is the fireproof member 4. The disk-shaped fireproof members were placed on a disk portion 22a supported by the rotating shaft 22.

Rotation motor 9 was mounted below the stage 30 which was leveled by raising and lowering adjusting screws 21. The rotation shaft 22 was rotated by the rotation motor 9 at 7.5 rpm, and at the same time, was swayed along one direction in the range of 80 mm by translation motor 10. The lowering speed of the target 5 was 2.4 mm/h. During the synthesis of the silica glass, the position of the synthesis surface was checked through furnace monitoring window 41, and based on the monitored conditions, the position of the synthesis surface was adjusted to a predetermined position by controlling the gas flow amounts from the burner 7.

This working example was equipped with reduction gear 19 having a reduction ratio of 1/25 and an elevation motor 18 having a brake. Therefore, even if the power was turned off, the stage 30 would not fall down. Also, in this synthetic silica glass manufacturing apparatus 1, the weight applied to the stage 30 was as much as 400 kg, but even when the brake in the elevation motor 18 was released by a corresponding signal, stage 30 would not start falling.

In addition, in the past, the alignment necessary after completing the maintenance of the synthetic silica glass manufacturing apparatus 1 took approximately 1 hour. However, since this example was equipped with saucers 20 and adjustment screws 21 as described above, the time required for the alignment was only about 15 minutes.

As described above, the synthetic silica glass manufacturing apparatus according to the present invention raises and lowers the stage not by the direct lowering of the rotation shaft that rotates the target but through an elevation post that is arranged in parallel with the rotation shaft. Therefore, it is not necessary to provide the space directly below the stage for the elevation system. Moreover, as compared with the case where a jack is used, a longer stroke can be obtained. Therefore, long and high quality synthetic silica glass ingot can be manufactured for a shorter period of time in a compact space.

According to the present invention, by using a precision ball screw and a rail-shaped upright sliding unit for the elevation device, the accuracy in alignment is improved to within about 0.01 mm or less, and there is no post positional deviation after the alignment. In addition, by using a motor with a brake for the driving system, the elevation stage is prevented from falling even when the power is turned off. Also, by combining a reduction gear with the motor having a brake, it is possible, using the resistance of the reduction gear, to prevent the elevation stage from falling due to natural causes such as electricity blockage, thereby increasing safety of the apparatus.

In addition, in the case that the alignment of the elevation system is conducted using the saucers and supporting legs, it is preferable to use various saucers respectively having an inverse cone-shaped slot, a V-shaped gutter, and a planar upper surface. With this structure, since the base is mounted by placing its supporting legs on the respective saucers, there is no shift generated at the supporting leg engaged with the saucer having the cone-shaped slot. Thus, a rough adjustment of the elevation system can be conducted. Also even when there are changes in pitch between the supporting legs due to an increase in temperature during the synthesis, the supporting legs are always engaged with the grooves so that the base can be supported without causing positional shift or internal stress.

It is preferable for the supporting legs to be screwed into the base, so that when the supporting legs are rotated, the supporting legs can be raised and lowered relative to the base. By this structure, it is possible to adjust the inclination of the base by raising and lowering the supporting legs. Accordingly, precise adjustment of the inclination angle of the elevation system can easily be conducted. In addition, it is preferable to have the portion of the supporting legs that come in contact with the saucer have a hemispherical shape. With this structure, the area of contact with each saucer becomes small, and therefore, it is possible to prevent positional shifts on the saucer. Furthermore, according to the present invention, it is possible to reduce the alignment operation time for the synthetic silica glass manufacturing apparatus. Therefore, the silica glass synthesizing time can be longer relative to the maintenance time. Accordingly, it is possible to manufacture high quality synthetic silica glass which is acceptable for use in projection lenses for photolithography, efficiently and safely.

Second Preferred Embodiment

As stated above, for various reasons, silica glass synthesized by using the conventional synthetic silica glass manufacturing apparatus (described in the Background of the Invention section above) may have an irregular refractive index. One of the causes of these irregularities is fluctuation in the synthesis conditions during the synthesis of the silica glass. In particular, the temperature distribution in flame created by the burner imposes significant influences on the refractive index profile. Thus, by providing a uniform temperature distribution, it is possible to synthesize a synthetic silica glass having an excellent uniformity in the refractive index.

For that purpose, it is necessary to maintain a consistent relative positional relationship between the synthesis surface of the ingot and the burner. To this end, the stage supporting the glass ingot is lowered at the same speed as the growing speed of the ingot, as described above.

Figure 9:
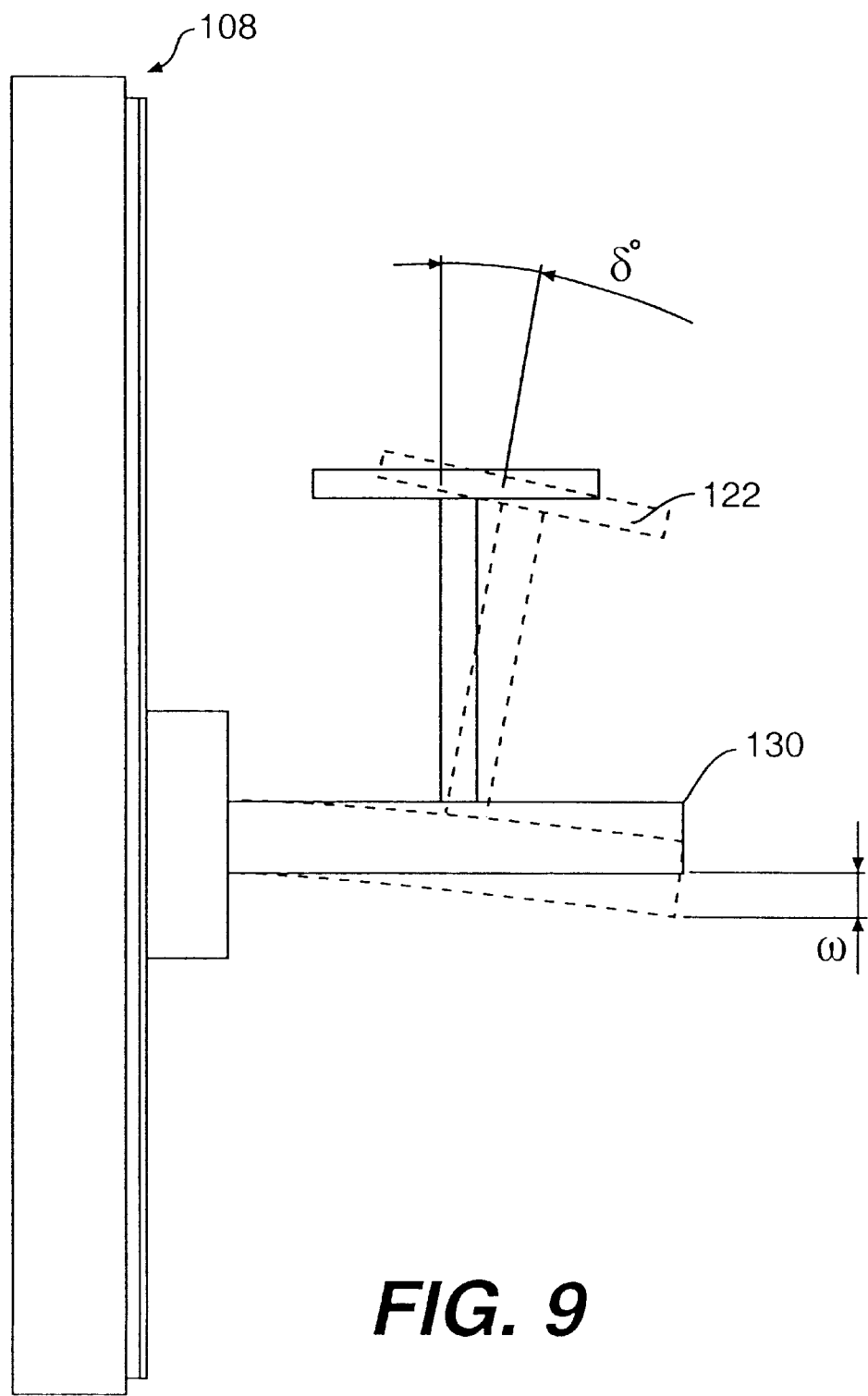
FIG. 9 is a schematic diagram used for explaining possible deformation of the stage in a synthetic silica glass manufacturing apparatus according to the present invention.

FIG. 9 shows a synthetic silica glass manufacturing apparatus having one elevation post 108 (at one side) for supporting stage 130. As illustrated in the figure, the stage 130 bends during the synthesis of silica glass; the bending amount ω increases from the start to the end of the synthesis due to differences in the weight of the ingot. Accordingly, the inclination angle δ of rotating shaft 122 increases and the relative horizontal position deviates from its design position. In such a synthetic silica glass manufacturing apparatus as structured to support the stage 130 on only one side, the bending amount ω is given by: $\omega=WL^3/24EI$, where W is the load, E is the Young's modulus, L is the distance from the edge to the loading point, and I is the cross-sectional second order moment. The inclination angle δ of the rotating shaft (target) 122 is given by $\delta=WL^2/8EI$.

In other words, with this structure, the bending amount ω is proportional to the load W. Therefore, when the weight of the ingot increases, the inclination angle δ of the rotating shaft increases, and thus, even if the horizontal position of the burner relative to the target is optimally aligned at the beginning of the synthesis, the synthesis may be conducted under different conditions over the synthesis process. If this occurs, the uniformity in the refractive index between the upper portion and the lower portion of the synthesized ingot may not be ensured.

When a heavy weight ingot is to be formed, therefore, it is difficult to prevent the bending of the stage with the one-side support structure regardless of what kind of metal material is used for the structure. Moreover, due to the recent trend towards increasing the size of the synthetic silica glass, it is becoming more and more necessary to increase the strength of the stage itself, resulting in increase in the weight of the stage. In this case, the degree of bending of the stage becomes greater.

Simply increasing the number of posts having the above-mentioned elevation structure to two or more (at right and left sides, for example) is not sufficient for solving the problems. When such a system of the elevation is used, since alignment of the apparatus is performed at room temperature, the elevation posts interfere with each other due to thermal expansion which occurs during synthesis of silica glass, thereby generating stress. As a result, the driving motor may be overloaded, and normal elevation function cannot be maintained.

In view of foregoing, a second preferred embodiment of a synthetic silica glass manufacturing apparatus according to the present invention is described with reference to FIGS. 4–8. Like components are indicated by the same reference numerals as in the first preferred embodiment above. The synthetic silica glass manufacturing apparatus 1 of this embodiment includes a furnace frame 3, a fireproof member 4 in the interior of the furnace frame 3, and a furnace base plate 2 supporting the furnace frame 3 and the fireproof member 4. In the space surrounded by the fireproof member 4, a target 5 is placed for supporting ingot IG. A burner 7 with a nozzle δ pointing toward the target 5 is provided for synthesizing and depositing silica glass on the target 5.

The furnace frame 3 has an exhaust opening 12 to discharge to the outside the exhaust generated in the interior 11 of the furnace frame 3 during the synthesis of the silica glass. In addition, an exhaust pipe 13 is connected to the exhaust nozzle 12. Along the exhaust pipe 13, removal devices, such as a scrubber and an exhaust fan (both are not shown in the figure), are provided to discharge the exhaust gas to the atmosphere.

In addition, a furnace monitoring window 41 is formed through the fireproof member 4 and the furnace frame 3 to allow observation of the interior 11 of the furnace from the outside. A heat-resistant glass 42 is installed outside of the furnace monitoring window 41 with a gap for providing sufficient heat isolation to maintain the temperature inside the furnace. A furnace monitoring camera 14, such as a CCD camera, is provided outside of the heat-resistant glass 42 to monitor the interior 11. With this construction, it is possible to monitor the distance between the burner 7 and the synthesis surface of the synthetic silica glass.

The target 5 is raised and lowered (only lowered during the synthesis) with an elevation system 8 (elevation device). The elevation system 8 includes parallelly disposed left and right support columns 23 and 24 extending in a direction perpendicular to a base 25, two sets of rails 16 attached to respective one of the left support column 23 and right support column 24, and left and right elevation members 33 and 34 adapted to be vertically movable along the respective rail sets 16. Each set of rails 16 on the left or right support (23 or 24) is constructed of two parallelly disposed rail parts.

Left and right elevation members 33 and 34 are installed to be vertically movable by rotating ball screws 17 arranged on the center of the rails 16 (between the two rail parts) of the respective set. The ball screws 17 are driven by elevation motors 18 installed in respective supports columns 23 and 24.

A stage (elevation stage) 30 is mounted on the left and right elevation members 33 and 34 in the elevation system 8. As shown in FIG. 6, the stage 30 includes supporting members 32 and top plate 31 placed on the supporting members 32.

The top plate 31 supports a rotation shaft 22 such that the shaft 22 freely rotates, sways, and moves horizontally in the XY directions. The rotation shaft 22 is rotated by a rotation motor 9 and is swayed by a translation motor 10. The rotation shaft 22 is supported on two or more points in the vertical direction by rotation bearings (not shown in figures), and its rotational frequency is controlled by the rotation motor 9.

The supporting members 32 are fixed to the left elevation member 33 with fastening bolts (not shown in the figures) or the like. On the other side, the left edges of supporting members 32 are merely placed on placement portion 34a (FIG. 4) of the right elevation member 34, to support the load only in the vertical direction (direction of gravity).

In the elevation system 8, as structured above, alignment of rotation shaft 22 and other components with respect to the vertical direction is necessary. To perform the alignment, first, a weight is vertically hung from the top, and then a vertical standard is set by sending a laser beam from an He—Ne laser 19L parallel to the weight. Then the inclination angle of the elevation system 8 is adjusted by having the laser beam from the He—Ne laser 19 penetrate through a hole (not shown in the figures) provided in the center of the target 5.

The adjustment of the inclination of the elevation system 8 is completed by adjusting the inclination of the base 25 by moving adjustment screws 21 in the vertical direction. These screws are structured to be extendable in the vertical direction relative to the base 25. Three or more of these adjustment screws 21 are provided with the base 25. The screws 21 are placed on saucers 20.

The center of rotation is aligned by moving the rotation shaft 22 in the X and Y directions using adjustment screw 35 provided on the stage 30. In addition, by using the laser beam from a He—Ne laser 19L, the upright pipe located at the center of the burner 7 for expelling material is aligned along the same axis of the center of rotation.

According to the synthetic silica glass manufacturing apparatus 1 as structured above, silica glass can be synthesized and deposited on the target 5 by expelling Si compound gas, as the material of the silica glass, and combustion gases for heating from the nozzle of the burner 7. Here, during the synthesis of the silica glass, the target 5 is rotated and swayed, and at the same time the target 5 is lowered by lowering the entire stage 30.

As described above, during the manufacturing process of the synthetic silica glass, the relative position between the burner 7 and the synthesis surface of the ingot IG significantly affects the quality of the resulting synthetic silica glass. Therefore, in order to synthesize a silica glass with an improved refractive index uniformity, it is necessary to maintain a predetermined distance between the burner 7 and the synthesis surface by lowering the target 5 with the same speed as the deposition speed.

To this end, the lowering speed of the stage 30 (target 5) by elevation system 8 is set at a specific speed, and the operator checks the image captured by CCD camera 14, and accordingly changes the amount of gas from the burner 7 to control the position of the synthesis surface so that the deposition speed of the synthetic silica glass equals the lowering speed while maintaining the specified diameter of the synthesizing silica glass.

Figure 7:
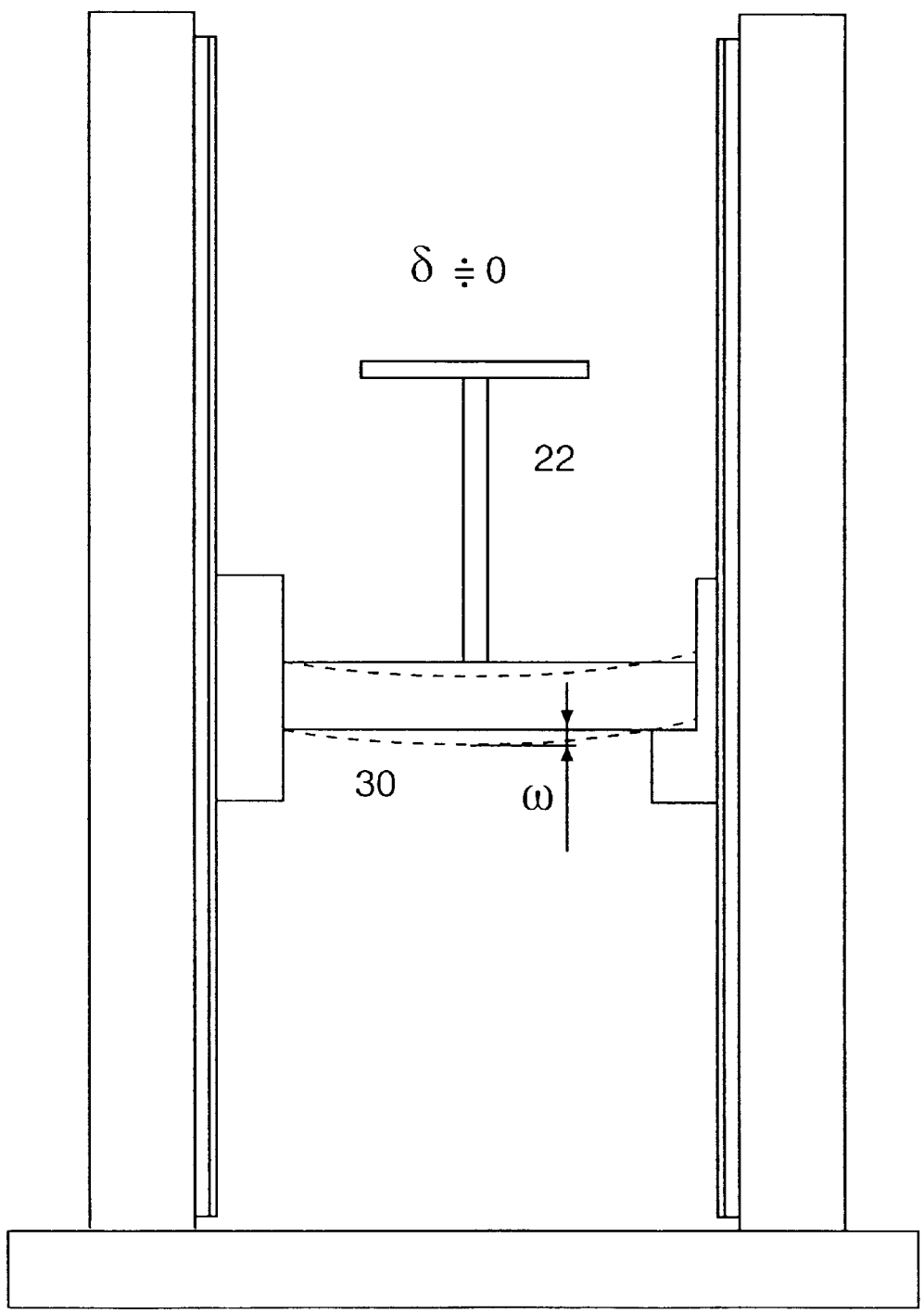
FIG. 7 is a schematic diagram showing deformation of the stage of a synthetic silica glass manufacturing apparatus according to the present invention.

Also, the greater (thicker) the diameter of the synthetic silica glass, the lower the deposition speed. During such synthesis of the silica glass, the weight of the ingot IG increases. Accordingly, the bending amount ω of the stage 30 also increases. However, in the elevation system 8, as described above, stage 30 is supported from both left and right sides, and therefore as shown in FIG. 7, only the center portion of the stage 30 bends in a symmetrical manner. Therefore, the rotation shaft 22 does not lean and the inclination angle δ is maintained to be close to zero.

As described above, the synthesis of silica glass can be conducted with an inclination angle δ of the target 5 being close to zero by supporting the stage 30 from both left and right sides and adjusting the load point to the center of the stage (rotation shaft 22 is located near the center of the stage 30 with respect to the lateral direction).

In order to improve repeatability, the alignment in the X and Y directions is preferably done only with respect to the left elevation member 33, which is the fastened side. Because the stage is not fixed to right elevation member 34, which is the supporting side, it is possible to prevent stoppage of the driving that may occur due to interference between the left and right rails 16 from thermal expansion.

In addition, the position of the synthesis surface (the top surface of the ingot IG) is monitored by the furnace monitoring camera 14. Accordingly, the position of the synthesis surface can be maintained without the relative distance to the fireproof member 4 and burner 7 being changed, and therefore, the thermal distribution on the synthesis surface is controlled to be consistent from the beginning to the end of the synthesis. In general, the thermal distribution of the oxy-hydrogen flame supplied from the burner 7 changes depending on that distance, and its absolute temperature changes as well. In accordance with the changes in the conditions of the hydrolysis reaction, the refractive index distribution of the deposited ingot IG changes, generating irregularities in the refractive index, called striae. However, as described above, the relative positions among the ingot, fireproof member, and burner can be maintained at the predetermined conditions (corresponding to the conditions at the beginning of the synthesis). Thus, it is possible to prevent generation of such striae.

In the present embodiment of synthetic silica glass manufacturing apparatus 1, in order to supply from the burner 7 thermal energy uniformly over a wide range of the synthesis surface, target 5 on the stage 30 is rotated and swayed. The center of the sway of the target 5 can be regarded as the average position of the load applied to the stage 30 in the vertical direction within the total time of the synthesis. Therefore, it is preferable to position the left and right rails 16 in a symmetrical manner with respect to this center of sway.

In the synthetic silica glass manufacturing apparatus 1 of the present embodiment, two elevation posts are provided along with two sets of rail 16. However, the present invention is not limited to such a structure. For example, the number of elevation posts is not limited to two. There can be three or even more posts. As long as the adjustment among the posts is not difficult, it is possible to manufacture synthetic silica glass without problems. Increasing the number of the elevation posts in the elevation system provides an advantage with regards to supporting the weight of the ingot. In this case, therefore, it is possible to decrease the value of δ.

Furthermore, it is not necessary to provide the elevation motor 18 to each of the left and right ball screws 17. It is acceptable to control each elevation shaft with one elevation motor 18 using, for example, a gear. In this case, it is not necessary to synchronize the two (or more) elevation motors 18, and therefore it is possible to simplify the electrical wiring and to prevent troubles that may otherwise occur in the control system.

Second Working Example

A second working example of the synthetic silica glass manufacturing apparatus 1 of the present invention is described with reference to FIGS. 4–6B. In this synthetic silica glass manufacturing apparatus 1, $SiCl_4$ was used as the Si compound for the material, and $O_2$ gas and $H_2$ gas were used for the carrier gas for carrying the Si compound. These gases were burned and heated by combustion that occurs in the space surrounded by the fireproof member 4 formed of a material that is 99.9% or more of alumina, and as a result, a synthetic silica glass was deposited on the target 5.

The circular-shaped bottom openings are provided in furnace frame 3 and fireproof member 4 to allow vertical movement of the target 5 therethrough. In addition, the target 5 is formed by stacking multiple pieces of disk-shaped fireproof members each having a diameter of 320 mm and made of 99.9% or more of alumina, as is the fireproof member 4. The target 5 is placed on disk portion 22a formed on the top of the rotating shaft 22.

Figures 6A, 6B:
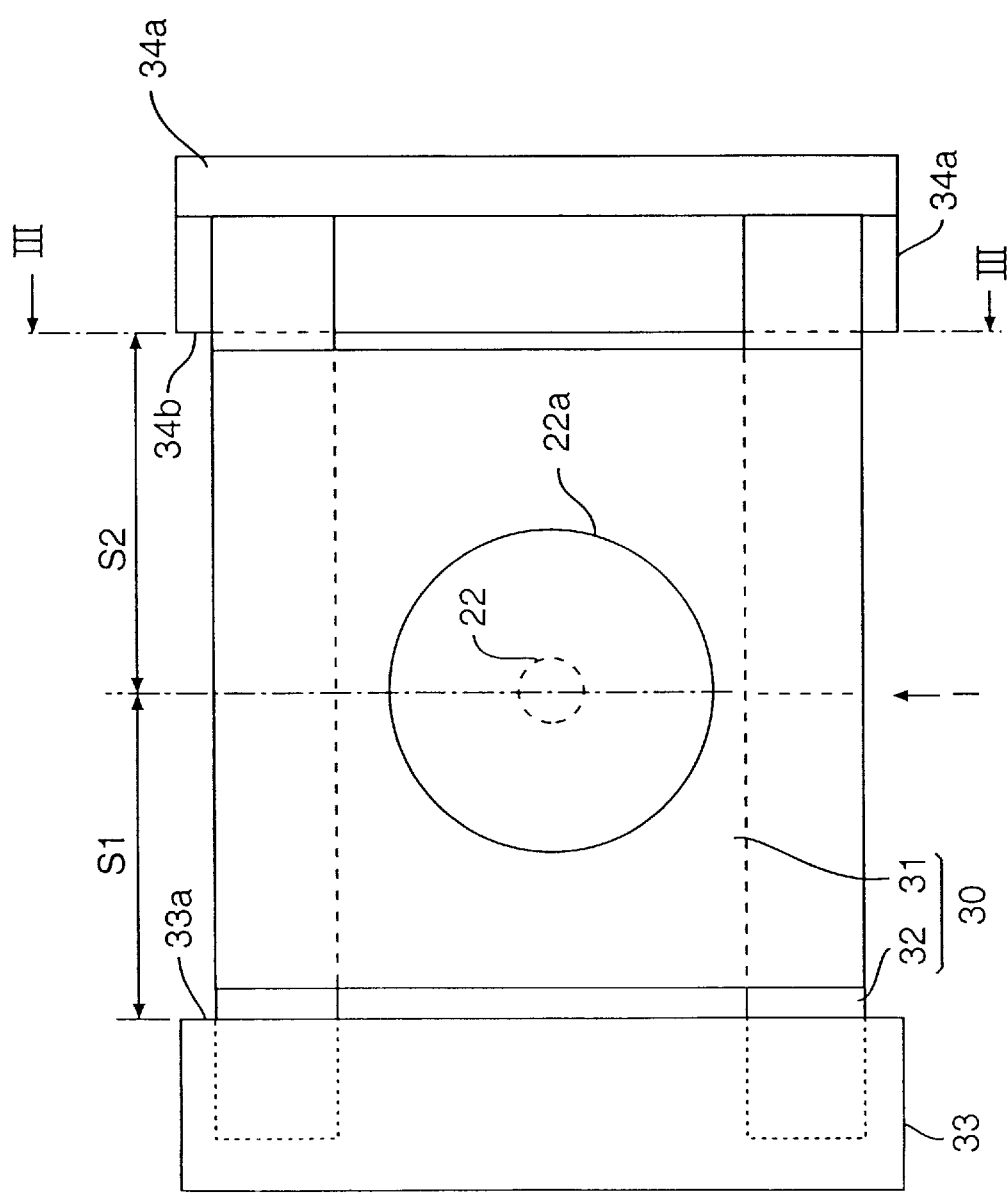
FIG. 6A is a schematic top view of a stage of a synthetic silica glass manufacturing apparatus according to the present invention.
FIG. 6B is a cross-sectional view taken along line III—III of FIG. 6A.

The stage 30 includes a top plate 31 formed as a 1000 mm square and supporting members 32 that support the top plate 31. The supporting members 32 are two parallel H-shaped pieces of steel each having a nominal dimension of 150× 150×10×7. The distance S1 from fastened edge 33a to the center of the rotating shaft 22, which is the center point of load, is 500 mm (FIG. 6A). The distance S2 from supporting point 34b to the center point of the load also is set to be 500 mm (FIG. 6A). When the stage 30 is in its lowest position, the distance from the stage 30 to the synthesis surface of the ingot IG is 2500 mm.

The stage 5 was rotated by rotation shaft 22 at 7.5 rpm through rotation motor 9, and at the same time is swayed in an axial direction in the range of 80 mm by translation motor 10. The lowering speed of the target 5 was set to be 1.2 mm/h. The position of the synthesis surface was checked through the furnace monitoring window 41 during the synthesis of the silica glass, and based on the detected conditions, the position of the synthesis surface was controlled by changing the amount of gas from the burner 7.

The weight of the ingot IG increases as the synthesis progresses. The maximum weight of the ingot after the synthesis is finished can be as much as 600 kg. The inclination angle of the stage 30 during the synthesis was measured by an inclination detector (not shown in the figures) provided on the stage 30 to obtain the inclination angle δ of the target 5 during the synthesis.

Figure 8:
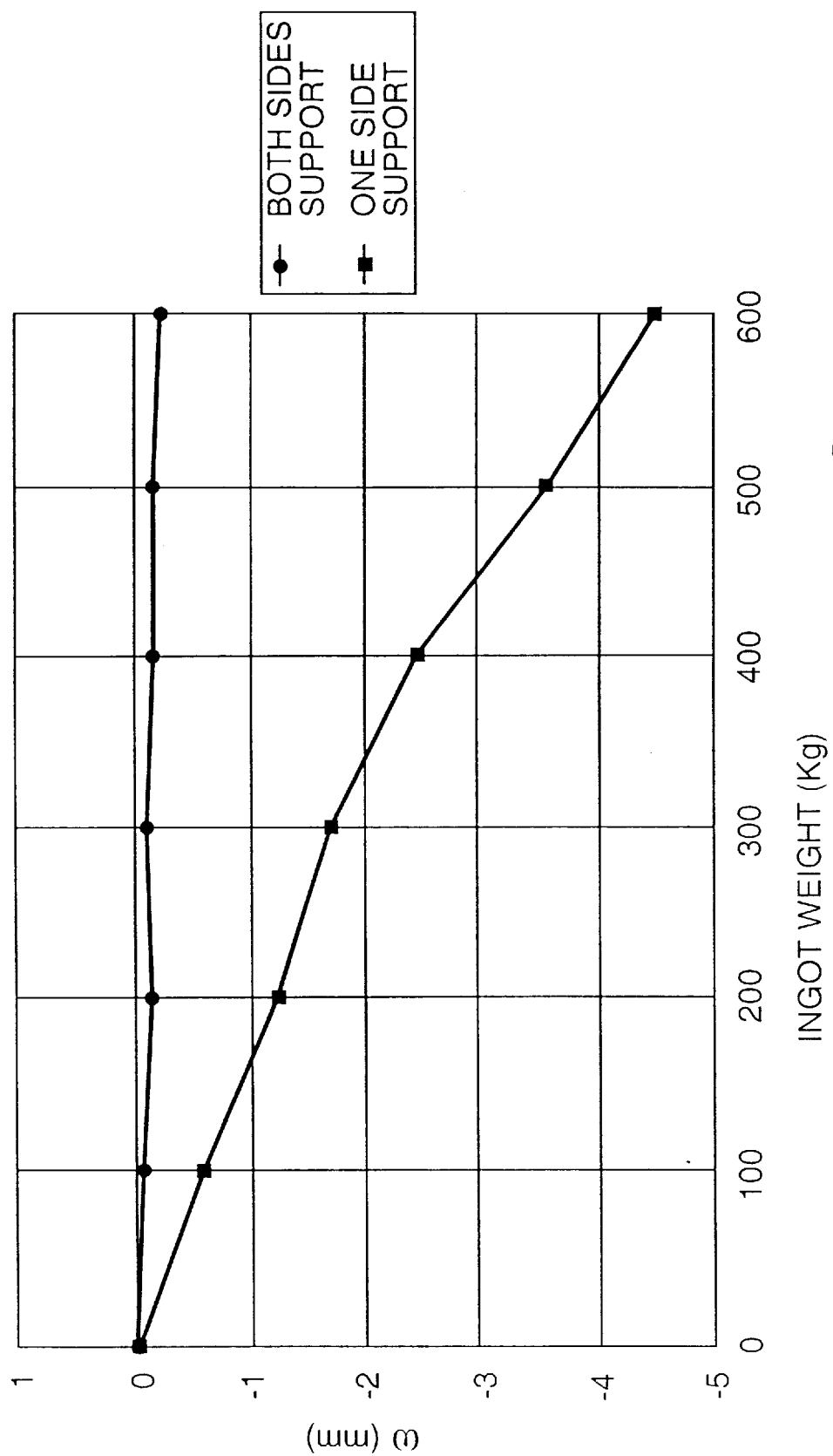
FIG. 8 is a graph showing measured results of the bending amounts for the cases of one-side fixing and of both-side fixing.

FIG. 8 shows the results of the measurement of the bending amount ω of the rotation shaft (or target) for this example of the synthetic silica glass manufacturing apparatus 1 (stage 30 is supported from both sides) and for a synthetic silica glass manufacturing apparatus shown in FIG. 9 (stage 130 is supported from only one side) under the same synthesis conditions.

As shown in the figure, in the case of one-sided support, the increase in ω is roughly proportional to the weight of the ingot. Several samples were taken from the resulting ingot and the refractive index profile was measured by an oil-on-plate method. The results revealed that there is fluctuation in the distribution of the refractive index between the upper portion and the lower portion of the ingot.

When the stage is supported from both sides, the bending amount ω shown in FIG. 7 is given by $\omega = WL^3/48EI$, where W is the load, E is the Young's modulus, L is the distance from the edge to the load point, and I is the cross-sectional second order moment of the subject structure. Thus, if the rotation shaft 22 is located at the center of the fastened edge 33a and the supporting point 34b, the theoretical inclination angle δ of the rotation shaft 22 is negligble because it only moves in the vertical direction.

In other words, as shown in FIGS. 7 and 8, even if δ is not strictly zero at the time of start-up, since there is no correlation between δ and the weight increase of the ingot, there would be no change in the positional relationship between the burner 7 and the synthesis surface from the start to the end of the synthesis. Therefore, as compared with the elevation system with the elevation stage fastened only at one side, the distribution of the temperature at the synthesis surface can be maintained highly consistent from the start to the end of the synthesis. In fact, when the refractive index was measured in the same manner as above, almost no difference was detected in the distribution of the refractive index between the bottom portion and the top portion of the resulting ingot.

As described above, in this aspect of the present invention, the synthetic silica glass manufacturing apparatus of the present invention is equipped with an elevation stage that supports the target on which the ingot of synthetic silica glass is deposited at two or more points. Therefore, the undesirable inclination of the synthesis surface that may occurs due to an increase in the ingot weight can be eliminated or minimized. Thus, the relative position between the burner and the synthesis surface can be maintained constant, and accordingly, it is possible to maintain a predetermined thermal distribution in the supplied thermal energy from the burner.

According to this aspect of the present invention, because all of the alignment conditions set at the beginning of the synthesis can be maintained, it becomes possible to obtain a synthetic silica glass having a high quality from the top to the bottom of the ingot. Thus, it becomes possible to effectively manufacture synthetic silica glass that is acceptable for use in stable and high-quality projection lenses for photolithography. In addition, it is possible to increase the yield and to lower the costs.

In this aspect of the synthetic silica glass manufacturing apparatus of the present invention, it is preferable that the elevation stage is fastened to one of the elevation members among multiple elevation members, and that the elevation stage is supported in the vertical direction by being merely placed on the other elevation members without being fastened. With this structure, even when the elevation stage expands or contracts due to thermal expansion because of the difference between the room temperature and the temperature during the synthesis, no interference is generated between the different elevation posts, preventing the elevation motor from being overloaded. Therefore, vertical motion of the stage can be performed reliably and smoothly.

It will be apparent to those skilled in the art that various modifications and variations can be made in the synthetic silica glass manufacturing apparatus of the present invention without departing from the spirit or scope of the invention. Thus, it is intended that the present invention cover the modifications and variations of this invention provided they come within the scope of the appended claims and their equivalents.

What is claimed is:

1. A synthetic silica glass manufacturing apparatus comprising:
    a furnace having an opening at its bottom;
    a target;
    a burner having a nozzle pointing towards the target for synthesizing silica glass on the target;

an elevation stage;

a vertically extending shaft fixed to the target and supported by the elevation stage to be rotationally and translationally movable relative to the elevation stage; and an elevation system that moves the elevation stage in the vertical direction so as to move the target through the opening of the furnace in the vertical direction relative to the burner, the elevation system including:

an elevation post extending in the vertical direction and disposed in parallel with the vertically extending shaft, an elevation member engaged with the elevation post to be movable relative to the elevation post in the vertical direction, the elevation member supporting the elevation stage, and a drive system that drives the elevation member relative to the elevation post in the vertical direction.

2. A synthetic silica glass manufacturing apparatus, comprising:

a furnace having an opening at its bottom;

a target;

a burner having a nozzle pointing towards the target for synthesizing silica glass on the target;

an elevation stage;

a vertically extending shaft fixed to the target and supported by the elevation stage to be rotationally and translationally movable relative to the elevation stage; and an elevation system that moves the elevation stage in the vertical direction so as to move the target through the opening of the furnace in the vertical direction relative to the burner, the elevation system including:

an elevation post extending in the vertical direction and disposed in parallel with the vertically extending shaft, an elevation member engaged with the elevation post to be movable in the vertical direction, the elevation member supporting the elevation stage, and a drive system that drives the elevation member in the vertical direction, wherein the elevation post includes a vertically extending rail engaged with the elevation member, and wherein the drive system includes a precision ball screw engaged with the elevation member, a motor with a brake for rotating the precision ball screw, and a reduction gear coupling the motor with the precision ball screw to transmit a reduced rotation of the motor to the precision ball screw.

3. A synthetic silica glass manufacturing apparatus, comprising:

a furnace having an opening at its bottom;

a target;

a burner having a nozzle pointing towards the target for synthesizing silica glass on the target;

an elevation stage;

a vertically extending shaft fixed to the target and supported by the elevation stage to be rotationally and translationally movable relative to the elevation stage; and an elevation system that moves the elevation stage in the vertical direction so as to move the target through the opening of the furnace in the vertical direction relative to the burner, the elevation system including:

an elevation post extending in the vertical direction and disposed in parallel with the vertically extending shaft;

an elevation member engaged with the elevation post to be movable in the vertical direction, the elevation member supporting the elevation stage;

a drive system that drives the elevation member in the vertical direction;

a base that mounts the elevation post thereon;

at least three supporting legs projecting from the base; and at least three saucers to be fixed on a floor, the at least three saucers being structured such that, when fixed on the floor, the at least three saucers each support the respective one of the at least three supporting leges, one of the at least three saucers having a slot that allows the corresponding supporting leg to be placed therein, another one of the at least three saucers having a gutter that allows the corresponding supporting leg to be placed therein, the remaining one of the at least three saucers having a planar surface for placing the corresponding supporting leg thereon.

4. The synthetic silica glass manufacturing apparatus according to claim 3, wherein the slot in the one of the at least three saucers is an inverse cone-shaped slot.

5. The synthetic silica glass manufacturing apparatus according to claim 3, wherein the gutter in the another one of at least three saucers is a V-shaped gutter.

6. The synthetic silica glass manufacturing apparatus according to claim 3, wherein the gutter in the another one of the at least three saucers is a straight groove pointing towards the slot in the one of the at least three saucers.

7. The synthetic silica glass manufacturing apparatus according to claim 3, wherein one or more of the at least three supporting legs are screwed into the base so that each of the one or more of at least three supporting legs may be raised and lowered relative to the base by rotating the corresponding supporting leg.

8. The synthetic silica glass manufacturing apparatus according to claim 3, wherein each of the bottom ends of the at least three supporting legs to be in contact with the saucers has a hemispherical shape.

9. A synthetic silica glass manufacturing apparatus, comprising:

a furnace having an opening at its bottom;

a target;

a burner having a nozzle pointing towards the target for synthesizing silica glass on the target;

an elevation stage;

a vertically extending shaft fixed to the target and supported by the elevation stage to be rotationally and translationally movable relative to the elevation stage; and an elevation system that moves the elevation stage in the vertical direction so as to move the target through the opening of the furnace in the vertical direction relative to the burner, the elevation system including:

a plurality of elevation posts arranged in a substantially symmetrical configuration in a horizontal plane with respect to the center of a load that is to be applied to the elevation stage in the vertical direction due to an increase in the weight of the silica glass on the target during the synthesis, and a plurality of elevation members each engaged with the respective one of the elevation posts, each of the elevation members being movable relative to the corresponding elevation post in the vertical direction and supporting the elevation stage.

10. A synthetic silica glass manufacturing apparatus, comprising:
   a furnace having an opening at its bottom;
   a target;
   a burner having a nozzle pointing towards the target for synthesizing silica glass on the target;
   an elevation stage;
   a vertically extending shaft fixed to the target and supported by the elevation stage to be rotationally and translationally movable relative to the elevation stage; and
   an elevation system that moves the elevation stage in the vertical direction so as to move the target through the opening of the furnace in the vertical direction relative to the burner, the elevation system including:
      a plurality of elevation posts arranged in a substantially symmetrical configuration in a horizontal plane with respect to the center of a load that is to be applied to the elevation stage in the vertical direction due to an increase in the weight of the silica glass on the target during the synthesis, and
      a plurality of elevation members each engaged with the respective one of the elevation posts, each of the elevation members being movable in the vertical direction and supporting the elevation stage,
   wherein the elevation stage is fastened to one of the elevation members, and at least some of the remaining elevation members support the elevation stage without being fastened to the elevation stage.

11. The synthetic silica glass manufacturing apparatus according to claim 9, wherein the elevation system further includes a drive system that drives the respective elevation members relative to the corresponding elevation posts in the vertical direction.

12. An apparatus for synthesizing a silica glass ingot, comprising:
   a stage having a target plate thereover, the target plate being rotatable relative to the stage around a predetermined vertical axis;
   a furnace for reacting material gas with combustion gas to synthesize the silica glass ingot on the target plate; the furnace having an opening at its bottom; and
   an elevation system that moves the stage in a vertical direction parallel to the predetermined vertical axis so as to vertically move the target plate through the opening of the furnace, the elevation system supporting the stage from at least one side of the stage and lacking a structure directly below the stage that would substantially interfere with the vertical movement of the stage, the elevation system being configured to be installed on a floor such that one contact point of the elevation system with the floor is immobilized along the floor and at least one of other contact points of the elevation system with the floor is movable along the floor in a direction substantially pointing towards said one contact point.

13. The apparatus according to claim 12, wherein the stage includes a rotation shaft extending along the predetermined vertical axis, the rotation shaft being fixed to the target plate and rotatable relative to the stage.

14. The apparatus according to claim 12, wherein the elevation system includes:
   an elevation post outside of and in parallel with the furnace, the elevation post extending in the vertical direction; and
   an elevation member engaged with the elevation post to be movable in the vertical direction, the elevation member supporting the stage from the at least one side of the stage.

15. An apparatus for synthesizing a silica glass ingot, comprising:
   a stage having a target plate thereover, the target plate being rotatable relative to the stage around a predetermined vertical axis;
   a furnace for reacting material gas with combustion gas to synthesize the silica glass ingot on the target plate; the furnace having an opening at its bottom; and
   an elevation system that moves the stage in a vertical direction parallel to the predetermined vertical axis so as to vertically move the target plate through the opening of the furnace, the elevation system supporting the stage from at least one side of the stage and lacking a structure directly below the stage that would substantially interfere with the vertical movement of the stage, the elevation system including:
      an elevation post outside of and in parallel with the furnace, the elevation post extending in the vertical direction;
      an elevation member engaged with the elevation post to be movable in the vertical direction, the elevation member supporting the stage from the at least one side of the stage;
      a base that mounts the elevation post thereon;
      at least three supporting legs projecting downwards from the base, the lengths of projecting portions of the at least three supporting legs being adjustable; and
      at least three saucers to be fixed on a floor, the at least three saucers being structured such that, when fixed on the floor, the at least three saucers each support the respective one of the at least three supporting leges, one of the at least three saucers having a slot, another one of the at least three saucers having a straight gutter pointing towards the slot, the remaining one of the at least three saucers having a planar surface.

16. The apparatus according to claim 12, wherein the elevation system includes
   a plurality of elevation posts outside of and in parallel with the furnace, the elevation post extending in the vertical direction, the plurality of elevation posts being arranged in a substantially symmetrical configuration with respect to the center of a load that is to be applied to the stage due to an increase in the weight of the silica glass ingot on the target plate during the synthesis; and
   a plurality of elevation members each engaged with the respective one of the elevation posts to be movable in the vertical direction, each of the elevation members supporting the stage from sides of the stage.

17. An apparatus for synthesizing a silica glass ingot, comprising:
   a stage having a target plate thereover, the target plate being rotatable relative to the stage around a predetermined vertical axis;
   a furnace for reacting material gas with combustion gas to synthesize the silica glass ingot on the target plate; the furnace having an opening at its bottom; and
   an elevation system that moves the stage in a vertical direction parallel to the predetermined vertical axis so as to vertically move the target plate through the opening of the furnace, the elevation system supporting the stage from at least one side of the stage and lacking a structure directly below the stage that would substantially interfere with the vertical movement of the stage, the elevation system including:

a plurality of elevation posts outside of and in parallel with the furnace, the elevation post extending in the vertical direction, the plurality of elevation posts being arranged in a substantially symmetrical configuration with respect to the center of a load that is to be applied to the stage due to an increase in the weight of the silica glass ingot on the target plate during the synthesis; and a plurality of elevation members each engaged with the respective one of the elevation posts to be movable in the vertical direction, each of the elevation members supporting the stage from sides of the stage, wherein the stage is fastened to one of the elevation members, and at least some of the remaining elevation members support the stage without being fastened to the stage.

18. The apparatus according to claim 16, wherein the elevation system further includes a drive system that synchronously drives the elevation members in the vertical direction.

19. The apparatus according to claim 16, wherein the plurality of elevation posts includes a left elevation post disposed at the left of the furnace and a right elevation post disposed at the right of the furnace.

20. An apparatus for synthesizing a silica glass ingot, comprising:

a stage having a target plate thereover, the target plate being rotatable relative to the stage around a predetermined vertical axis;

a furnace for reacting material gas with combustion gas to synthesize the silica glass ingot on the target plate; the furnace having an opening at its bottom; and an elevation system that moves the stage in a vertical direction parallel to the predetermined vertical axis so as to vertically move the target plate through the opening of the furnace, the elevation system supporting the stage from at least one side of the stage and lacking a structure directly below the stage that would substantially interfere with the vertical movement of the stage, the elevation system including:

a plurality of elevation posts outside of and in parallel with the furnace, the elevation post extending in the vertical direction, the plurality of elevation posts being arranged in a substantially symmetrical configuration with respect to the center of a load that is to be applied to the stage due to an increase in the weight of the silica glass ingot on the target plate during the synthesis;

a plurality of elevation members each engaged with the respective one of the elevation posts to be movable in the vertical direction, each of the elevation members supporting the stage from sides of the stage;

a base that mounts the plurality of elevation posts;

at least three supporting legs projecting downwards from the base, the lengths of projecting portions of the at least three supporting legs being adjustable; and at least three saucers to be fixed on a floor, the at least three saucers being structured such that, when fixed on the floor, the at least three saucers each support the respective one of the at least three supporting leges, one of the at least three saucers having a slot, another one of the at least three saucers having a straight gutter pointing towards the slot, the remaining one of the at least three saucers having a planar surface.

* * * * *